(12) United States Patent
Hao et al.

(10) Patent No.: US 11,048,308 B2
(45) Date of Patent: Jun. 29, 2021

(54) DISPLAY SCREEN

(71) Applicant: SHENZHEN INFILED ELECTRONICS CO., LTD, Shenzhen (CN)

(72) Inventors: Zongchao Hao, Shenzhen (CN); Qiuhe Liu, Shenzhen (CN); Rihao Hu, Shenzhen (CN)

(73) Assignee: SHENZHEN INFILED ELECTRONICS CO., LTD, Shenzhen (CN)

( * ) Notice: Subject to any disclaimer, the term of this patent is extended or adjusted under 35 U.S.C. 154(b) by 0 days.

(21) Appl. No.: 16/630,857

(22) PCT Filed: Aug. 27, 2019

(86) PCT No.: PCT/CN2019/102684
§ 371 (c)(1),
(2) Date: Jan. 14, 2020

(87) PCT Pub. No.: WO2020/107968
PCT Pub. Date: Jun. 4, 2020

(65) Prior Publication Data
US 2021/0048855 A1    Feb. 18, 2021

(30) Foreign Application Priority Data
Nov. 30, 2018  (CN) .......................... 201811456240.7

(51) Int. Cl.
*G06F 1/18*    (2006.01)
*F16M 11/04*   (2006.01)

(52) U.S. Cl.
CPC ........... *G06F 1/181* (2013.01); *F16M 11/041* (2013.01); *F16M 2200/028* (2013.01)

(58) Field of Classification Search
CPC  G06F 1/181; F16M 11/041; F16M 2200/028; F16M 2200/02;
(Continued)

(56) References Cited

U.S. PATENT DOCUMENTS

| 4,142,747 A | 3/1979 | Beck |
| 5,348,374 A * | 9/1994 | Kuo ....................... A47D 1/004 |
| | | 297/344.18 |

(Continued)

FOREIGN PATENT DOCUMENTS

| CN | 202939922 U | 5/2013 |
| CN | 203535911 U | 4/2014 |

(Continued)

*Primary Examiner* — Christopher Garft
(74) *Attorney, Agent, or Firm* — Bayramoglu Law Offices LLC

(57) ABSTRACT

A display screen includes a display frame, a detachable display module connected to the display frame, and a locking mechanism mounted on the back of the display module for locking the display module to the display frame. The display frame has at least two frame bars arranged in a row and at intervals, and any two adjacent frame bars are provided with at least two engaged grooves spaced opposite to each other. The locking mechanism includes two telescopic rods and a drive assembly for driving the two telescopic rods to be inserted into or pulled out from the engaged grooves arranged on the two frame bars, respectively. The drive assembly is installed on the back of the display module and connected to the two telescopic rods.

7 Claims, 10 Drawing Sheets

(58) Field of Classification Search
CPC .. F16M 2200/025; F16M 11/28; F16M 11/22; F16M 11/04; F16M 11/043; Y10S 248/919; F21V 21/26; G09F 9/302; G09F 9/3026; G09F 7/18; G09F 2007/1804; G09F 2007/1821; G09F 2007/1836; G09F 2007/1834; G09F 2007/1852
See application file for complete search history.

(56) References Cited

U.S. PATENT DOCUMENTS

| | | | | |
|---|---|---|---|---|
| 5,468,051 | A * | 11/1995 | Huang | A47D 1/004 248/125.3 |
| 8,081,431 | B2 * | 12/2011 | Fan | F16M 11/046 361/679.05 |
| 2006/0291155 | A1 * | 12/2006 | Chen | G06F 1/181 361/679.02 |
| 2007/0146979 | A1 * | 6/2007 | Chen | G06F 1/1601 361/679.21 |
| 2007/0205345 | A1 * | 9/2007 | Chen | F16M 11/18 248/297.31 |
| 2009/0057501 | A1 * | 3/2009 | Huang | F16M 11/42 248/157 |
| 2010/0232104 | A1 * | 9/2010 | Tang | E05B 65/006 361/679.58 |
| 2010/0320339 | A1 * | 12/2010 | Fan | F16M 11/2021 248/125.8 |
| 2014/0247612 | A1 * | 9/2014 | Hochman | G06F 3/1446 362/427 |
| 2015/0163928 | A1 | 6/2015 | Cho et al. | |

FOREIGN PATENT DOCUMENTS

| | | |
|---|---|---|
| CN | 205842158 U | 12/2016 |
| CN | 107387512 A | 11/2017 |
| CN | 107393427 A | 11/2017 |
| CN | 109751489 A | 5/2019 |
| GB | 2558858 A | 7/2018 |

* cited by examiner

DISPLAY SCREEN

CROSS REFERENCE TO THE RELATED APPLICATIONS

This application is the national phase entry of International Application No. PCT/CN2019/102684, filed on Aug. 27, 2019, which is based upon and claims priority to Chinese Patent Application No. 201811456240.7, filed on Nov. 30, 2018, the entire contents of which are incorporated herein by reference.

TECHNICAL FIELD

The present disclosure relates to the field of display devices, in particular to a display screen.

BACKGROUND

In the field of display devices, most of the large display screens are formed by assembling at least two display modules. However, the quality of display modules is inconsistent due to imperfect packaging of lamp beads and deficient manufacturing such as subsequent patching. These defective display modules then must be replaced.

At present, the display modules are fixed by screw fixation mode or magnetic adsorption. There are advantages and disadvantages to screw fixation and magnetic adsorption. Display modules fixed by screws are relatively firm, but are inconvenient for maintenance and replacement. Display modules fixed by magnetic adsorption can be disassembled quickly without removing screws, but are not resistant to wind, as a result it easier for the displays fixed by magnetic adsorption to fall under windy conditions. Some display manufacturers add a safety rope behind the display modules as a safety precaution but this solution may be unsightly.

SUMMARY

In order to overcome the shortcomings of the prior art, the present application discloses a display screen, so as to solve the problems of troublesome replacement and unstable connections of the existing display modules.

The technical solution of the present application is as follows.

A display screen, including a display frame, a detachable display module connected to the display frame, and a locking mechanism mounted on the back of the display module for locking the display module to the display frame. The display frame has at least two frame bars arranged in a row and at intervals, and any two adjacent frame bars are provided with at least two engaged grooves spaced opposite to each other. The locking mechanism includes two telescopic rods and a drive assembly for the two telescopic rods to be inserted into or pulled out from the engaged grooves arranged on the two frame bars, respectively. The drive assembly is installed on the back of the display module and connected to the two telescopic rods.

Preferably, the drive assembly is a knob assembly arranged on the back of the display module. One end of each of the two telescopic rods is hinged to a side of the knob assembly.

Preferably, the knob assembly includes a knob and a rotating member with one end connected to the knob. One end of each of the two telescopic rods is hinged to a side of the rotating member.

Preferably, the rotating member includes a plate body, a first bulge disposed on a side of the plate body, and a second bulge arranged on the other side of the plate body. The first bulge is connected to the knob. A limiting hole is arranged on the back of the display module, and the second bulge is mounted in the limiting hole and capable of rotating therein. One end of each of the two telescopic rods is hinged to a side of the plate body.

Preferably, the plate body is respectively provided with a first through hole on both sides, where the first through holes are arranged oppositely in the extension direction of the first bulge, and one end of each of the two telescopic rods is provided with a second through hole. The locking mechanism further includes two pins, and the telescopic rods are hinged with the plate body by means of the pins penetrating the first through hole and the second through hole.

Preferably, the display module is provided with two arc-shaped holes on the side of the limiting hole at an interval along a circumferential direction, and one end of each pin away from the knob is arranged in the arc-shaped hole and capable of sliding therein; and/or, the display module includes a module bracket and a lamp panel mounted on the module bracket. The locking mechanism is arranged on the back of the module bracket, and the module bracket is provided with the limiting hole. The second bulge is provided with an inner hexagonal hole, and the lamp panel is provided with a disassembly hole in alignment with the limiting hole penetrating the lamp panel.

Preferably, each telescopic rod includes a first rod portion with one end extending into the engaged groove and a second rod portion with one end hinged with the other end of the first rod portion. One end of each second rod portion away from the first rod portion is hinged with the plate body.

Preferably, the locking mechanism further includes a cover plate mounted on the back of the display module. A receiving cavity is formed between the cover plate and the display module. The side of the cover plate away from the display module is provided with a knob hole. A part of the knob is installed in the receiving cavity, and the other part of the knob protrudes out of the receiving cavity through the knob hole. The cover plate is provided with a third bulge on both sides of the knob hole opposite to each other, respectively. The opposite faces of the two third bulges are each provided with a first groove for locating the knob when the telescopic rod is extended into the engaged groove. Both sides of the knob opposite to each other are each provided with a fourth bulge engaged in the first groove.

Preferably, the back of the display module is concavely provided with a second groove, and the bottom surface of the second groove are convexly provided with two bumps at an interval for connecting with the cover plate. The side surface of the bump facing the cover plate is concavely provided with a first through groove, and the side surface of the cover plate connected to the bump is concavely provided with a second through groove. The first through groove and the second through groove surround to form a through hole for the telescopic rods to pass through. The second groove is divided by two bumps into a first groove portion and second groove portions located on both sides of the first groove portion opposite to each other. Two blocks are arranged on the two frame bars, respectively, and the two blocks are partially engaged in the second groove portions, respectively. The two engaged grooves are arranged on the two blocks, respectively.

Preferably, the display module further includes a plurality of first magnets. The back of the display module is further provided with a plurality of installation slots for mounting the first magnets. The face of the display frame matched with the display module is provided with a plurality of second magnets in alignment with the first magnets, or metal parts magnetically attached to the first magnets. Alternatively, the display frame is a metal frame body and magnetically attached to the first magnets; and/or, the number of the display modules is at least two. The number of the locking mechanisms is equal to the number of the display modules, and the number of the engaged grooves is twice the number of the display modules. Each display module is locked to the display frame through the locking mechanism, respectively.

Compared to the prior art, the advantages of the present application are as follows.

According to the display screen of the present application, a locking mechanism is arranged on the back of a display module, and the locking mechanism includes two telescopic rods and a drive assembly. The drive assembly is arranged on the back of the display module and connected to the two telescopic rods for driving the two telescopic rods to be extended into or pulled out from the engaged grooves, respectively. When the display module needs to be installed on a display frame, the user can drive the two telescopic rods to be engaged in two engaged grooves arranged opposite to each other on the display frame through the drive assembly, so that the display module can be firmly installed on the display frame and is less likely to fall in windy conditions. When the display module needs to be removed from the display frame, the operator only needs to pull out the two telescopic rods from the two engaged grooves and remove the display module through the drive assembly. In summary, this design facilitates the disassembly and assembly of the display module, and improves the installation efficiency.

DETAILED DESCRIPTION OF THE EMBODIMENTS

The present application is further described hereinafter in combination with the drawings and specific embodiments. It should be noted that under the premise of no conflict, the following embodiments or technical features can be arbitrarily combined to form a new embodiment.

Figure 1:
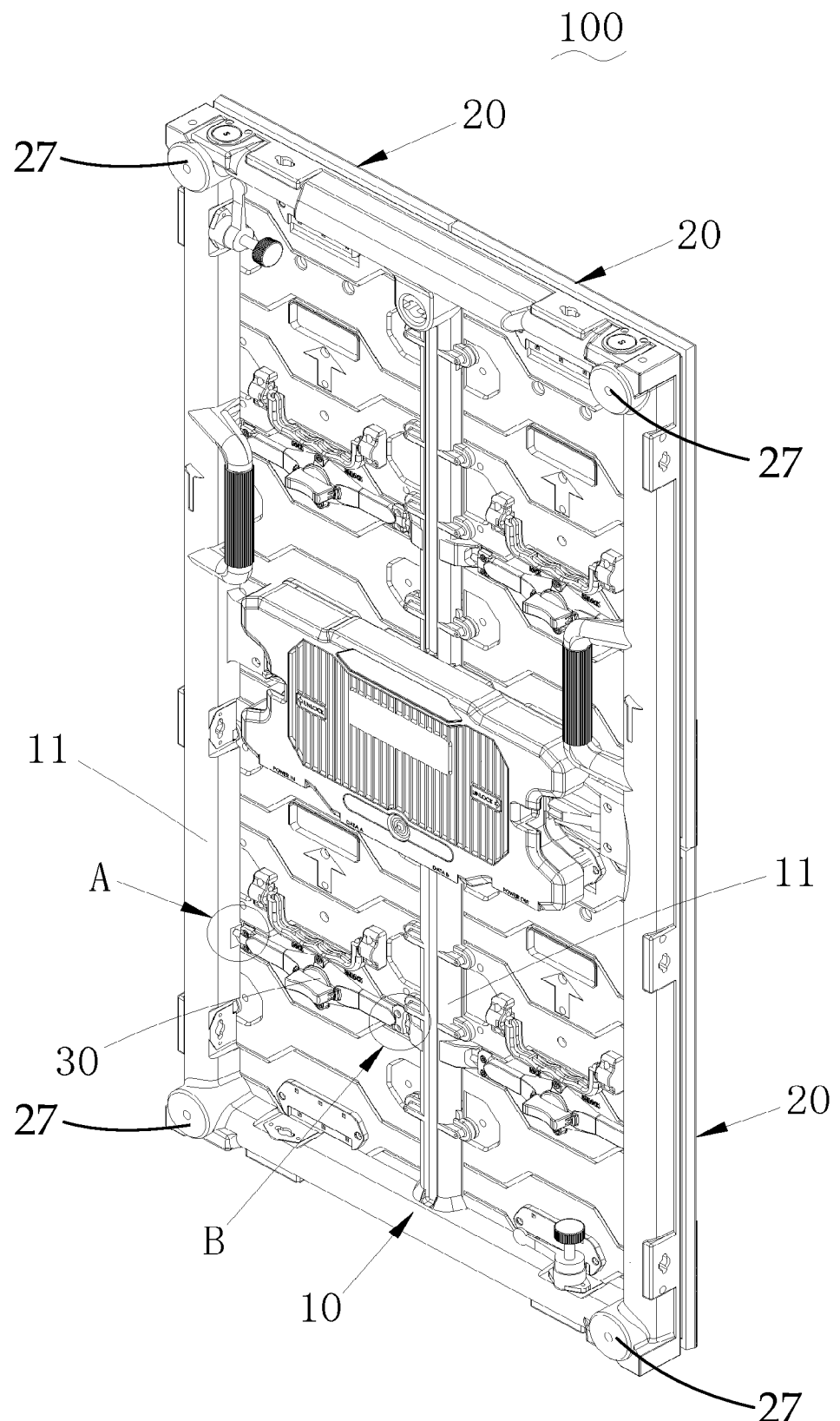
FIG. 1 is a schematic diagram showing the structure of the display screen disclosed in an embodiment of the present application.
Figure 2:
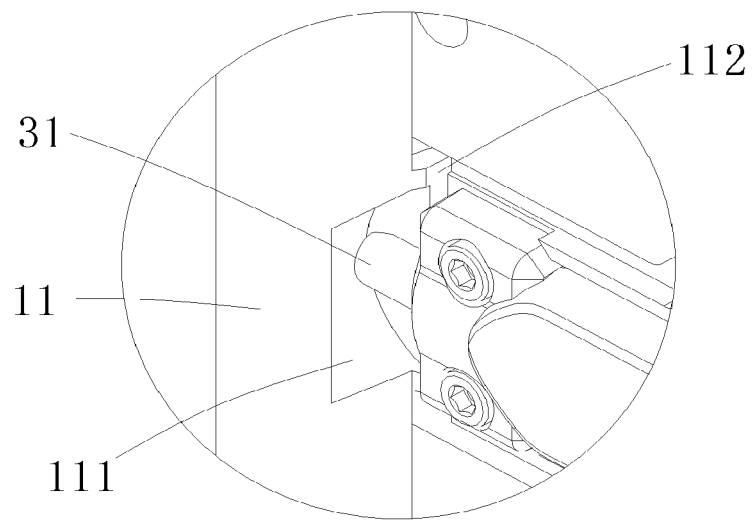
FIG. 2 is an enlarged view showing part A in FIG. 1.
Figure 3:
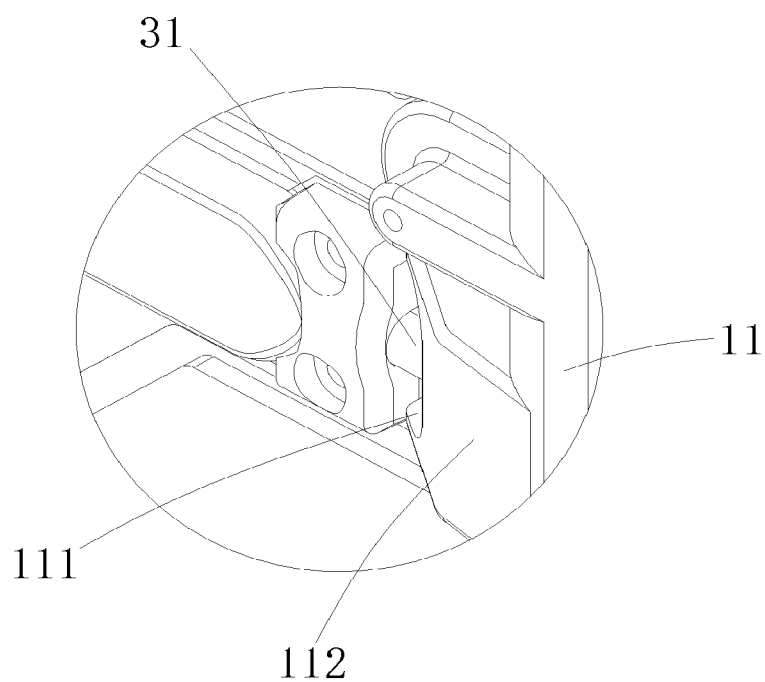
FIG. 3 is an enlarged view showing part B in FIG. 1.
Figure 4:
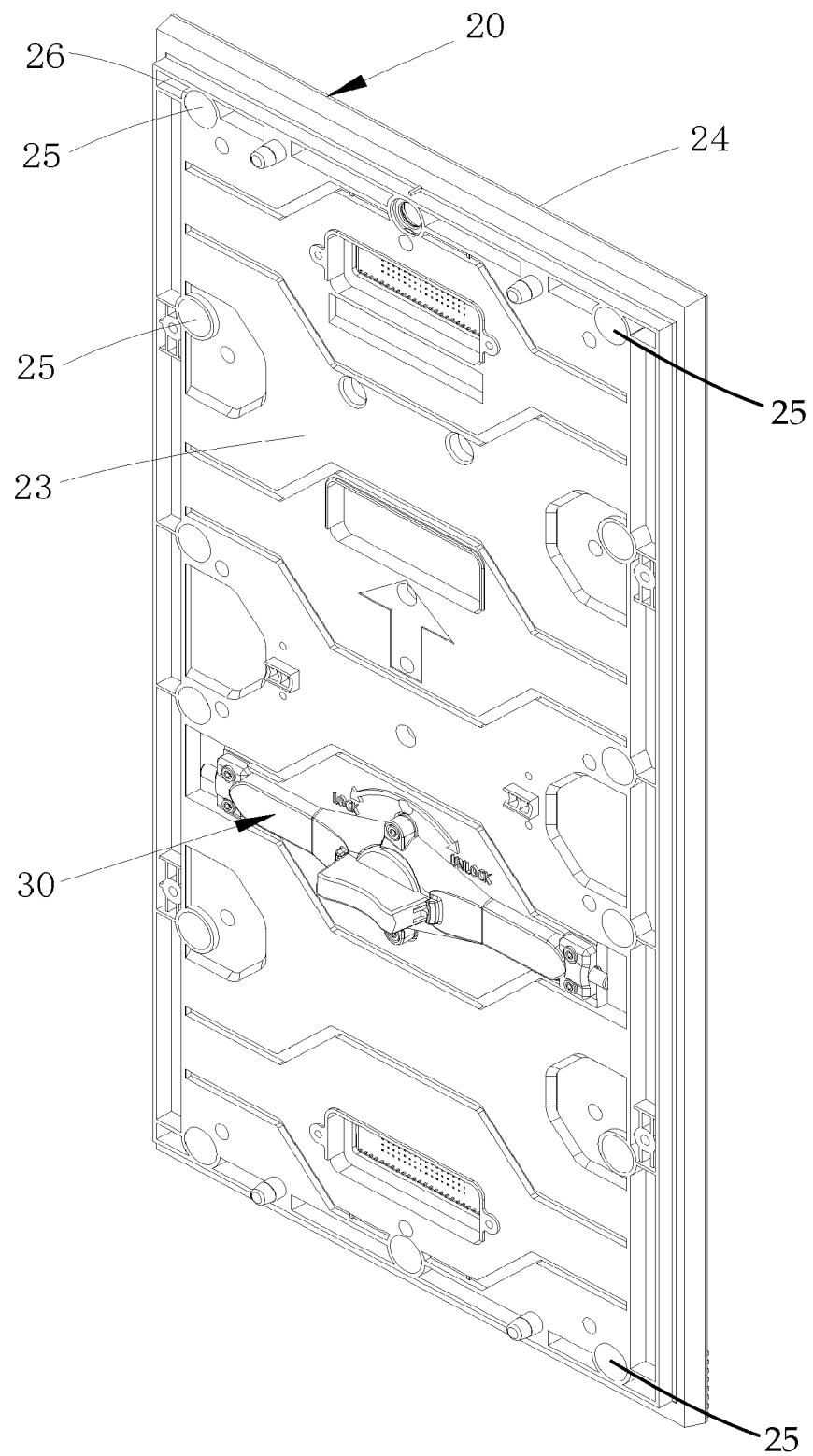
FIG. 4 is a schematic diagram showing a cooperation of the display module and the locking mechanism disclosed in an embodiment of the present application.
Figure 5:
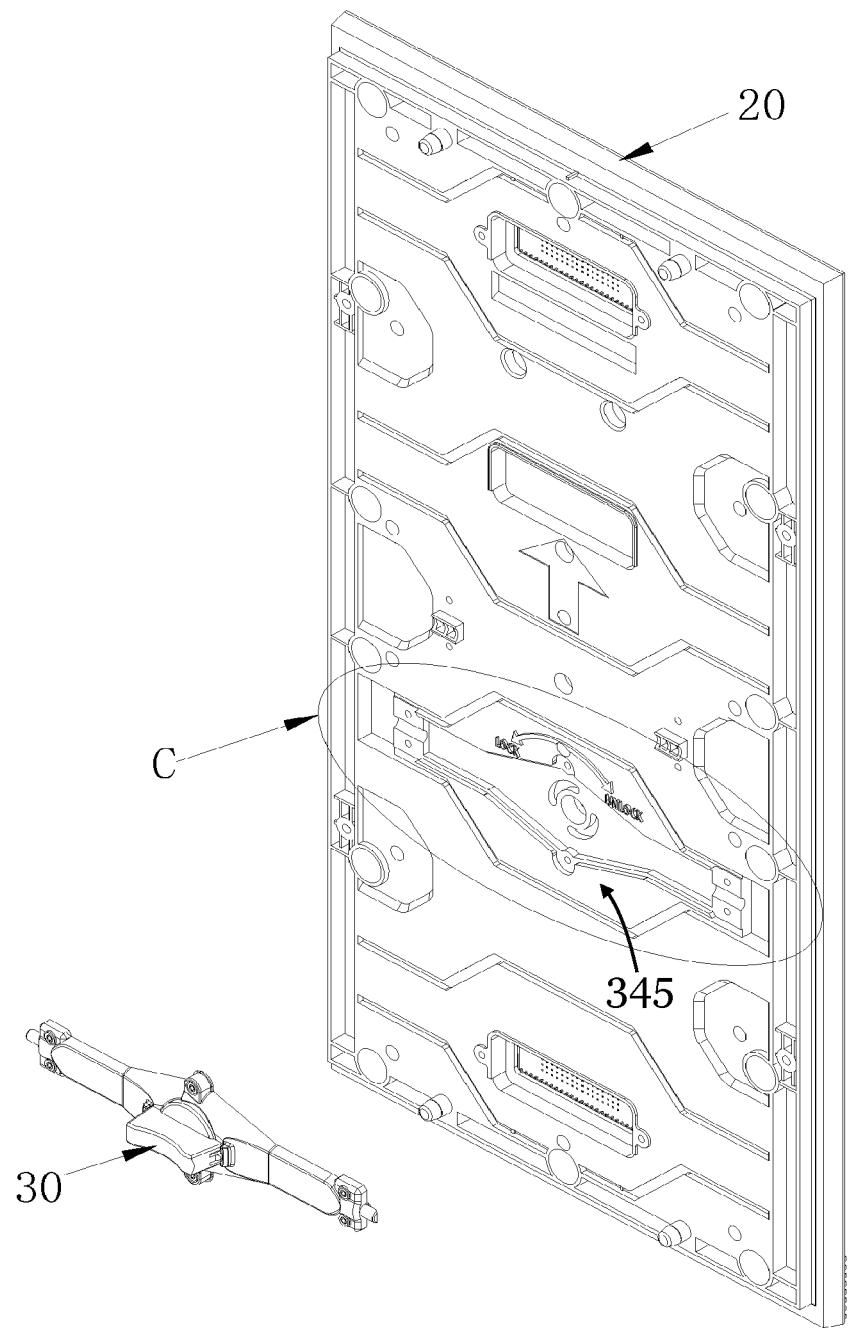
FIG. 5 is an exploded view of the display module and the locking mechanism disclosed in an embodiment of the present application.

Referring to FIGS. 1 to 5, the embodiment of the present application discloses the display screen 100, including the display frame 10, the display module 20 detachably connected to the display frame 10, and the locking mechanism 30 mounted on the back of the display module 20 for locking the display module 20 on the display frame 10. The display frame 10 has at least two frame bars 11 arranged in a row and at intervals, and any two adjacent frame bars 11 are provided with at least two engaged grooves 111 spaced opposite to each other. The locking mechanism 30 includes two telescopic rods 31 and the drive assembly 32 for driving the two telescopic rods 31 to be inserted into or pulled out from the engaged grooves 111 arranged on the two frame bars 11, respectively. The drive assembly 32 is installed on the back of the display module 20 and connected to the two telescopic rods 31.

In this design, the locking mechanism 30 is arranged on the back of the display module 20, and the locking mechanism 30 includes two telescopic rods 31 and the drive assembly 32. The drive assembly 32 is arranged on the back of the display module 20 and connected to the two telescopic rods 31 for driving the two telescopic rods 31 to be extended into or pulled out from the two engaged grooves 111, respectively. When the display module 20 needs to be installed on the display frame 10, the user can drive the two telescopic rods 31 to be engaged in the two engaged grooves 111 arranged opposite to each other on the display frame 10 through the drive assembly 32, so that the display module 20 can be firmly installed on the display frame 10 and is not likely to fall in windy conditions. When the display module 20 needs to be removed from the display frame 10, the operator only needs to pull out the two telescopic rods 31 from the two engaged grooves 111 through the drive assembly 32 and remove the display module 20. To sum up, this kind of design facilitates the disassembly and installation of the display module 20, and the installation efficiency can be effectively improved.

Figure 6:
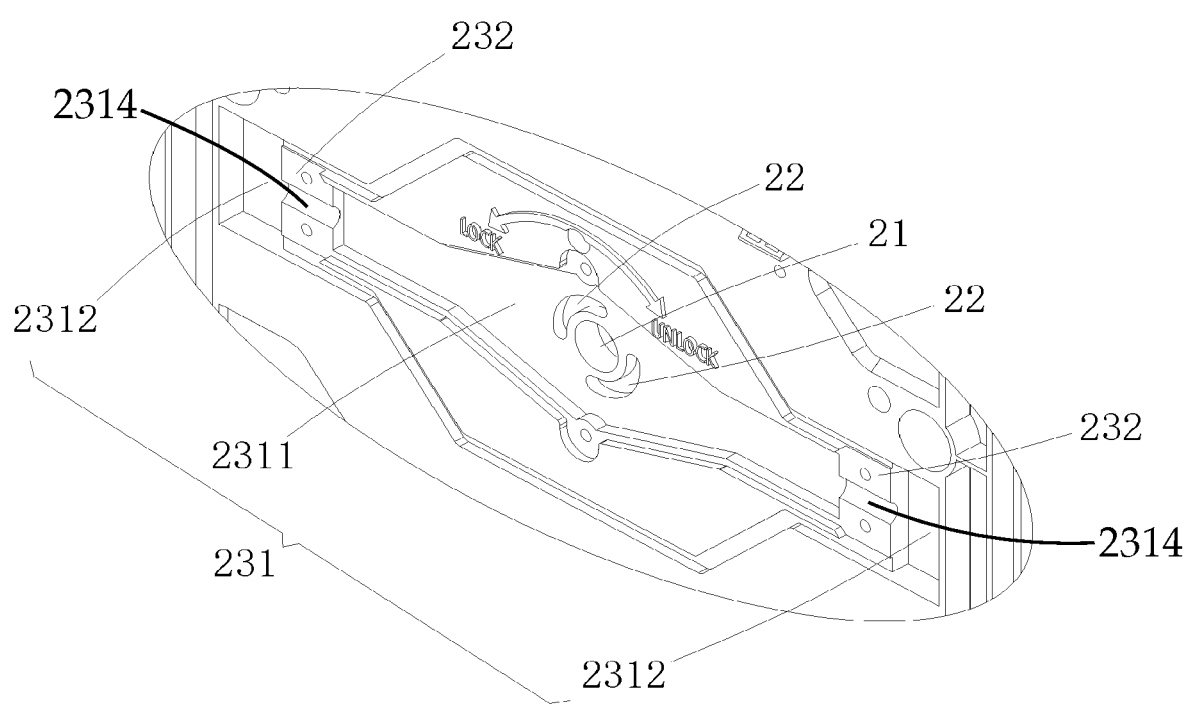
FIG. 6 is an enlarged view showing part C in FIG. 5.
Figure 7:
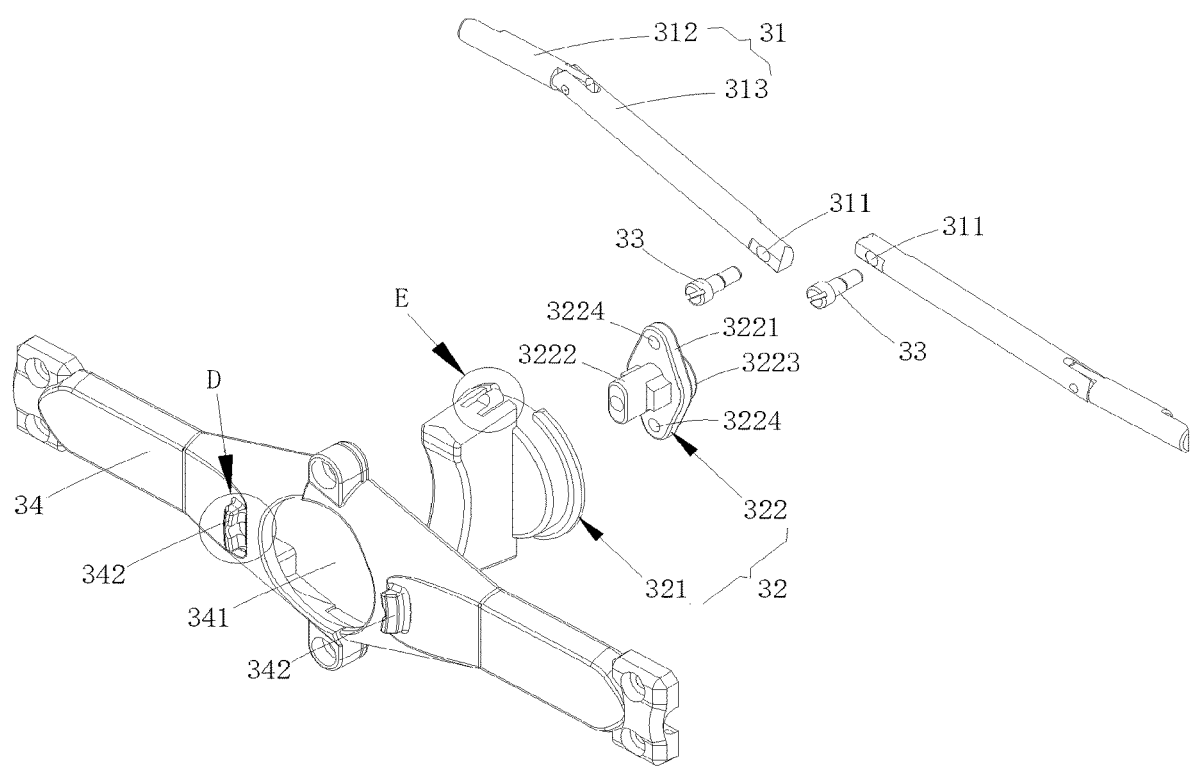
FIG. 7 is an exploded view of a first perspective of the locking mechanism disclosed in an embodiment of the present application.
Figure 8:
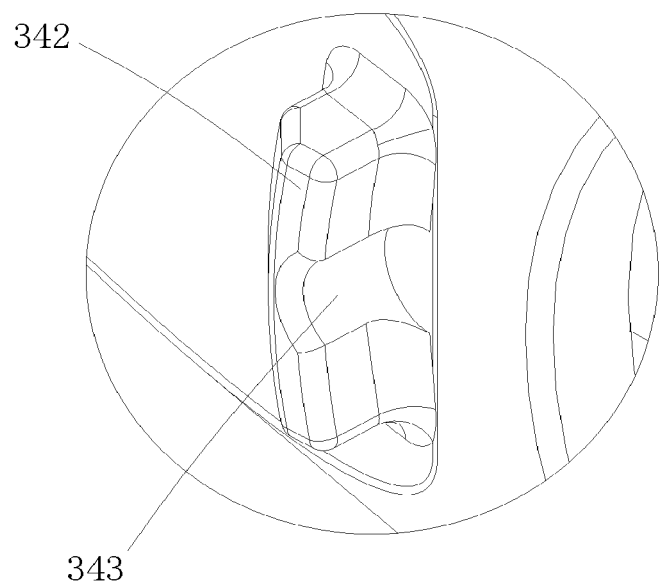
FIG. 8 is an enlarged view showing part D in FIG. 7.
Figure 9:
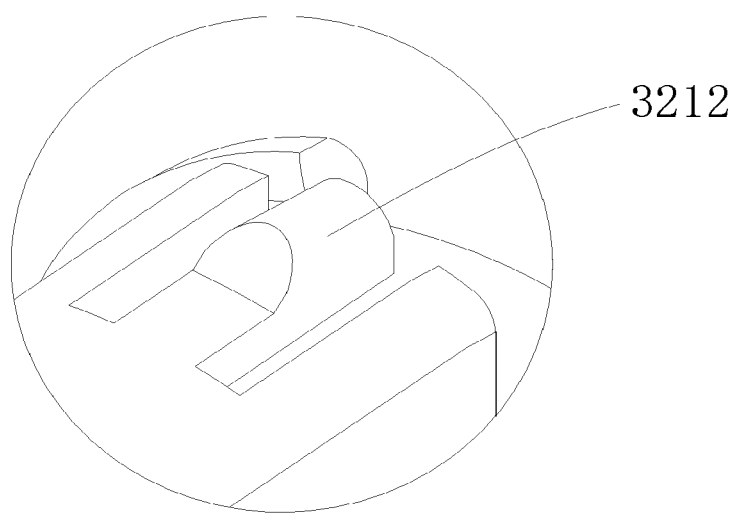
FIG. 9 is an enlarged view showing part E in FIG. 7.
Figure 10:
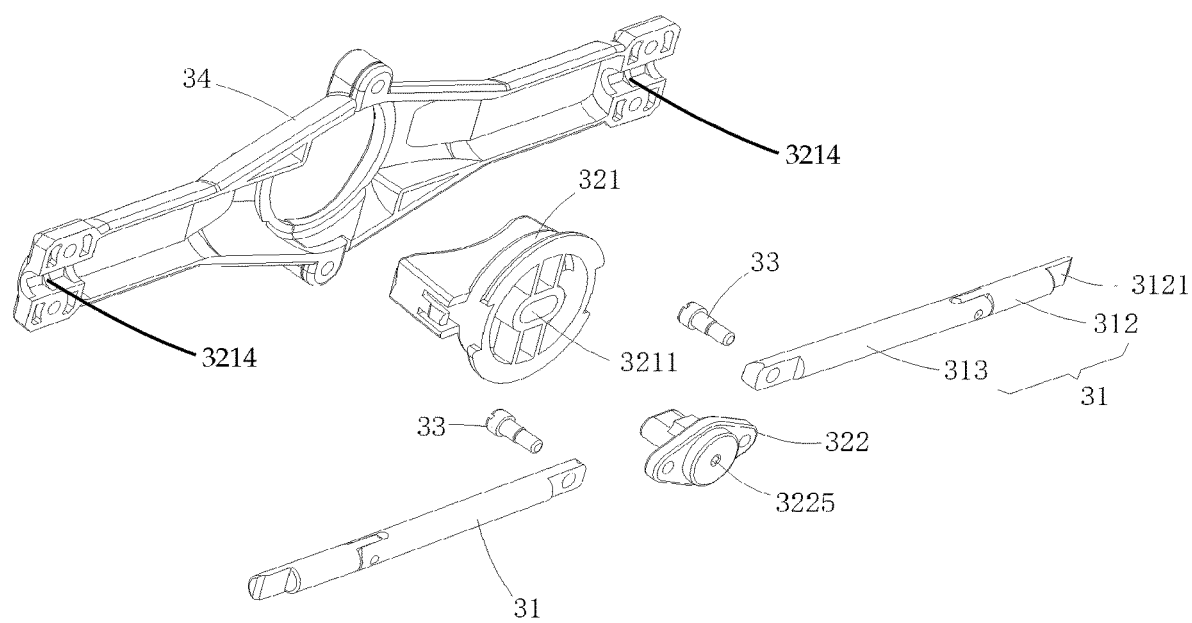
FIG. 10 is an exploded view of a second perspective of the locking mechanism disclosed in an embodiment of the present application.

Referring to FIGS. 6 to 10, preferably, the drive assembly 32 is a knob assembly arranged on the back of the display module, and one end of each of the two telescopic rods 31 is hinged with a side of the knob assembly 32, respectively. Preferably, the knob assembly 32 includes the knob 321 and the rotating member 322 with one end connected to the knob 321, and one end of each of the two telescopic rods 31 is hinged with a side of the rotating member 322.

Preferably, the rotating member 322 includes the plate body 3221, the first bulge 3222 disposed on one side of the plate body 3221, and the second bulge 3223 arranged on the other side of the plate body 3221. The first bulge 3222 is connected to the knob 321. The limiting hole 21 is arranged on the back of the display module 20, and the second bulge 3223 is mounted in the limiting hole 21 and capable of rotating therein. One end of each of the two telescopic rods 31 is hinged with a side of the plate body 3221. Specifically, the side of the knob 321 near the rotating member 322 is provided with the long waist-shaped hole 3211, and the cross section of the first bulge 3222 is in a runway shape matching the shape of the waist-shaped hole 3211. The first bulge 3222 is arranged in the long waist-shaped hole 3211 by means of penetration. Understandably, the knob 321 and the rotating member 322 may also be integrally formed. The second bulge 3223 is installed in the limiting hole 21 and capable of rotating therein, and the limiting hole 21 limits the operation of the rotating member 322, that is, the rotating member 322 does not deflect left and right in the process of pulling the telescopic rods 31, and the rotating member 322 rotates smoothly. The rotating member 322 is stressed uniformly, which can prolong the service life of the locking mechanism 20.

Preferably, the plate body 3221 is respectively provided with the first through hole 3224 on both sides, where the first through holes are arranged oppositely in the extension direction of the first bulge 3222, and one end of each of the two telescopic rods 31 is provided with the second through hole 311. The locking mechanism 30 further includes two pins 33, and the telescopic rods 31 are hinged with the plate body 3221 by means of the pins 33 penetrating the first through hole 3224 and the second through hole 311. Preferably, the pin 33 includes a pin cap, a first pin rod portion and a second pin rod portion, wherein the pin cap, the first pin rod portion and the second pin rod portion are connected sequentially. The outer wall of the first pin rod portion is smooth, the outer wall of the second pin rod portion is provided with screw threads, and the telescopic rod 31 is sleeved outside the first pin rod portion. The first through hole 3224 is a threaded hole, and the plate body 3221 is in screw-threaded fit with the second pin rod portion.

Preferably, the display module 20 is provided with two arc-shaped holes 22 on the side of the limiting hole 21 at an interval along the circumferential direction, and one end of each pin 33 away from the knob 321 is arranged in the arc-shaped hole 22 and capable of sliding therein. The two arc-shaped holes 22 limit the rotation of the knob 321. Here, the sliding arrangement means that the part of the pin 33 penetrating through the arc-shaped hole 22 can slide along the track of the arc-shaped hole 22.

Preferably, each telescopic rod 31 includes the first rod portion 312 with one end extending into the engaged groove 111 and the second rod portion 313 with one end hinged with the other end of the first rod portion 312. One end of each second rod portion 313 away from the first rod portion 312 is hinged with the plate body 3221. Preferably, one end of each first rod portion 312 away from the second rod portion 313 is provided with the notch 3121 facing the back of the display module 20, and the telescopic rod 31 is arranged in the engaged groove 111 of the frame bar 11 by the notch 3121.

Preferably, the locking mechanism 30 further includes the cover plate 34 mounted on the back of the display module 20. A receiving cavity 345 is formed between the cover plate 34 and the display module 20. The side of the cover plate 34 away from the display module 20 is provided with the knob hole 341. Apart of the knob 321 is installed in the receiving cavity 345, and the other part of the knob 321 protrudes out of the receiving cavity 345 through the knob hole 341. The cover plate 34 is provided with the third bulge 342 on both sides of the knob hole 341 opposite to each other, respectively. The opposite faces of the two third bulges 342 are each provided with the first groove 343 for locating the knob 321 when the telescopic rod 31 is extended into the engaged groove 111. Both sides of the knob 321 opposite to each other are each provided with the fourth bulge 3212 for being engaged in the first groove 3411. The first groove 343 is arranged on the third bulge 342, and both sides of the knob 321 opposite to each other are each provided with the fourth bulge 3212 for being engaged in the first groove 3411, so that when the locking mechanism 30 is in a locked state, the two third bulges 342 can fix the knob 321 through the first groove 343, thereby preventing the knob 321 from rotating due to contact, preventing the locking mechanism 30 from unlocking and preventing the display module 20 from falling off.

Preferably, the back of the display module 20 is concavely provided with the second groove 231, and the bottom surface of the second groove 231 are convexly provided with two bumps 232 at an interval for connecting with the cover plate 34. The second groove 231 is divided, by the two bumps 232, into the first groove portion 2311 and the second groove portions 2312 located on both sides of the first groove portion 2311 opposite to each other. The two blocks 112 are arranged on the two frame bars 11, respectively, and the two blocks 112 are partially engaged in the second groove portion 2312, respectively. The two engaged grooves 111 are arranged on the two blocks 112, respectively. The surface of the bump 232 facing the cover plate 34 is concavely provided with a first through groove 2314, and the surface of the cover plate 34 connected to the bumps 232 is concavely provided with a second through groove 3214. When the cover plate 34 is connected to the bumps 232, the first through groove 2314 and the second through groove 3214 surround to form a through hole for the telescopic rods 31 to pass through.

Preferably, the display module 20 further includes a plurality of the first magnets 25. The back of the display module 20 is further provided with a plurality of installation slots 26 for mounting the first magnets 25. The face of the display frame 10 matched with the display module 20 is provided with a plurality of second magnets 27 in alignment with the first magnets 25, or metal parts that can be magnetically attached to the first magnets 25. Alternatively, the display frame 10 is a metal frame body which can be magnetically attached to the first magnets 25. In this design, the display module 20 can be attached and fixed on the display frame 10 by the first magnets 25. In the actual installation process, the display module 20 is first attached on the display frame 10 through the first magnets 25, and then the display module 20 is locked on the display frame 10 through the locking mechanism 30, which makes the installation convenient. At the same time, the display module 20 and the display frame 10 are firmly connected, and the display module 20 does not fall off in case of windy conditions. Understandably, the first magnets 25 are not necessary, and the display module 20 can be fixed on the display frame 10 only through the locking mechanism 30.

Preferably, the number of the display modules 20 is at least two. The number of the locking mechanisms 30 is equal to the number of the display modules 20, and the number of the engaged grooves 111 is twice the number of the display modules 20. Each display module 20 is locked to the display frame 10 through one locking mechanism 30.

Figure 11:
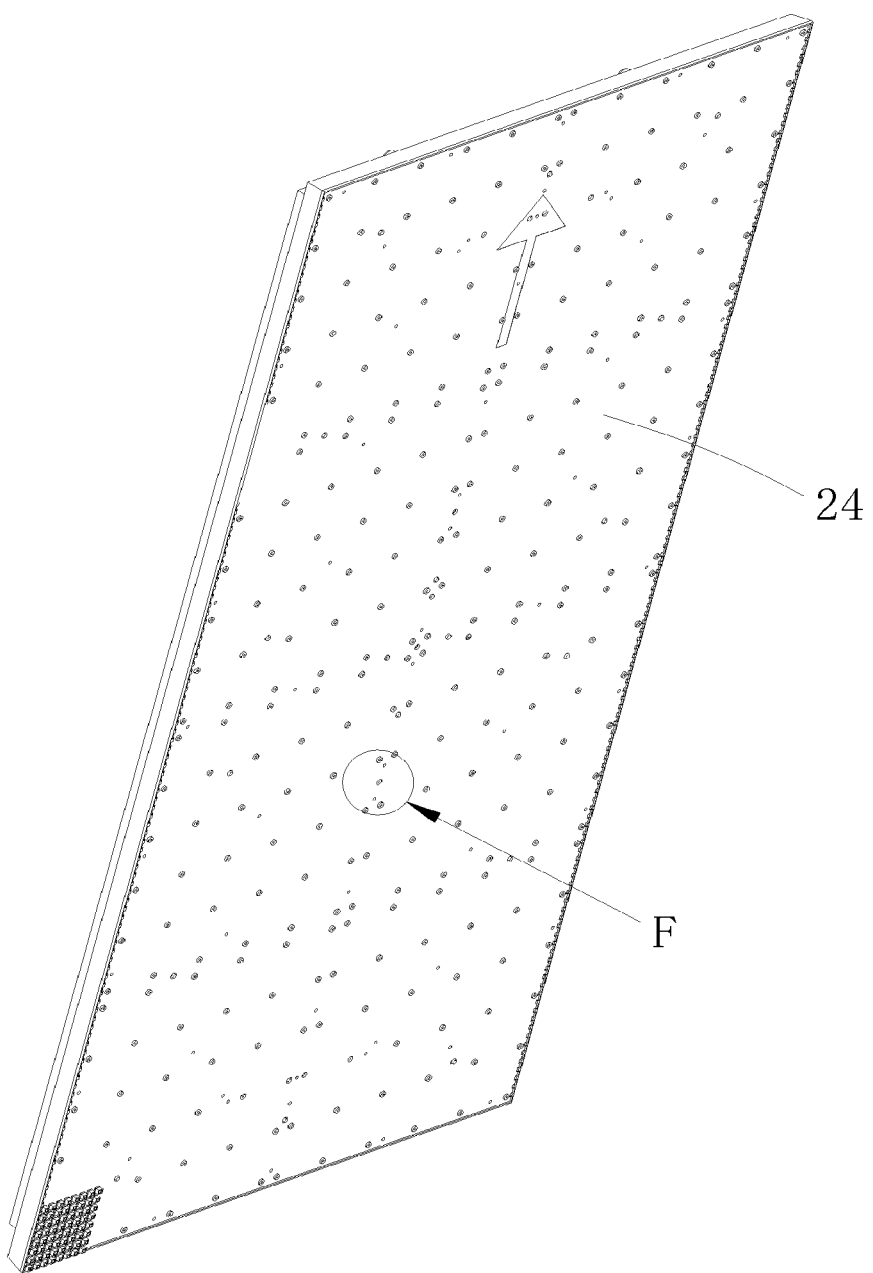
FIG. 11 is a schematic diagram showing the structure of the lamp plate disclosed in an embodiment of the present application.
Figure 12:
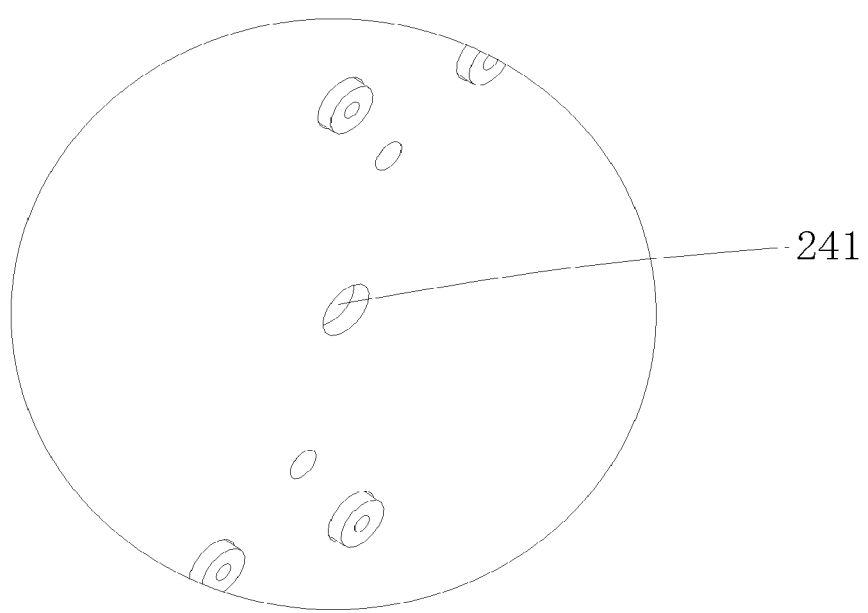
FIG. 12 is an enlarged view showing part F in FIG. 11.

Referring to FIGS. 4, 6, 11 and 12, preferably, the display module 20 includes the module bracket 23 and the lamp panel 24 mounted on the module bracket 23. The locking mechanism 30 is arranged on the back of the module bracket 23, and the module bracket 23 is provided with the limiting hole 21. The second bulge 3223 is provided with the inner hexagonal hole 3225, and the lamp panel 24 is provided with the disassembly hole 241 in alignment with the limiting hole 21 penetrating the lamp panel 24. By setting the inner hexagonal hole 3225, the user can unlock the locking mechanism 30 from the front of the lamp panel 24 with a hexagon wrench, and then remove the display module 20 from the front of the lamp panel 24. When the display module 20 is not convenient to be disassembled from the rear of the display screen 100, the inner hexagonal hole 3225 and the disassembly hole 241 are provided to facilitate maintenance from the front.

The implementation modes described above are only the preferred implementations of the present application and cannot be used to limit the protective scope of the present application. Any non-substantive changes and replacements made by those skilled in the art on the basis of the present application shall fall within the protective scope claimed by the present application.

What is claimed is:

1. A display screen, comprising a display frame, a display module detachably connected to the display frame, and a locking mechanism mounted on a back of the display module for locking the display module on the display frame;
   wherein the display frame comprises at least two frame bars arranged in a row and at intervals, and two adjacent frame bars of the at least two frame bars are provided with at least two engaged grooves spaced opposite to each other;
   the locking mechanism comprises a first telescopic rod, a second telescopic rod and a drive assembly for driving the first telescopic rod and the second telescopic rod to be inserted into or pulled out from the at least two engaged grooves arranged on the two adjacent frame bars, respectively;
   the drive assembly is installed on the back of the display module and connected to the first telescopic rod and the second telescopic rod;
   wherein, the drive assembly is a knob assembly arranged on the back of the display module, and an end of the first telescopic rod is hinged with a first side of the knob assembly and an end of the second telescopic rod is hinged with a second side of the knob assembly;
   wherein the knob assembly comprises a knob and a rotating member, one end of the rotating member is connected to the knob, and the end of the first telescopic rod is hinged with a first side of the rotating member and the end of the second telescopic rod is hinged with a second side of the rotating member;
   wherein the rotating member comprises a plate body, a first bulge disposed on a first side of the plate body, and a second bulge arranged on a second side of the plate body; the first bulge is connected to the knob; a limiting hole is arranged on the back of the display module, and the second bulge is mounted in the limiting hole and rotates in the limiting hole; the end of the first telescopic rod is hinged with a first end of the plate body and the end of the second telescopic rod is hinged with a second end of the plate body.

2. The display screen according to claim 1, wherein, the plate body is respectively provided with a first through hole on the first end of the plate body and the second end of the plate body, the first through hole on the first end of the plate body and the first through hole on the second end of the plate body are oppositely arranged in an extension direction of the first bulge; the end of the first telescopic rod and the end of the second telescopic rod are respectively provided with a second through hole; the locking mechanism further comprises a first pin and a second pin; the first telescopic rod is hinged with the plate body by means of the first pin penetrating the first through hole on the first end of the plate body and the second trough hole on the end of the first telescopic rod, and the second telescopic rod is hinged with the plate body by means of the second pin penetrating the first through hole on the second end of the plate body and the second trough hole on the end of the second telescopic rod.

3. The display screen according to claim 2, wherein, the display module is provided with a first arc-shaped hole and a second arc-shaped hole positioned on opposing sides of a limiting hole at an interval along a circumferential direction of the limiting hole; the end of the first pin away from the knob is arranged in the first arc-shaped hole and slides in the first arc-shaped hole, and the end of the second pin away from the knob is arranged in the second arc-shaped hole and slides in the second arc-shaped hole; and/or,
   the display module comprises a module bracket and a lamp panel mounted on the module bracket; the locking mechanism is arranged on a back of the module bracket, and the module bracket is provided with the limiting hole; the second bulge is provided with an inner hexagonal hole, and the lamp panel is provided with a disassembly hole in alignment with the limiting hole penetrating the lamp panel.

4. The display screen according to claim 1, wherein, each of the first telescopic rod and the second telescopic rod comprises a first rod portion and a second rod portion, wherein a first end of the first rod portion extends into the engaged groove, and a first end of the second rod portion is hinged with a second end of the first rod portion; a second end of the second rod portion away from the first rod portion is hinged with the plate body.

5. A display screen, comprising a display frame, a display module detachably connected to the display frame, and a locking mechanism mounted on a back of the display module for locking the display module on the display frame;
   wherein the display frame comprises at least two frame bars arranged in a row and at intervals, and two adjacent frame bars of the at least two frame bars are provided with at least two engaged grooves spaced opposite to each other;
   the locking mechanism comprises a first telescopic rod, a second telescopic rod and a drive assembly for driving the first telescopic rod and the second telescopic rod to be inserted into or pulled out from the at least two engaged grooves arranged on the two adjacent frame bars, respectively;
   the drive assembly is installed on the back of the display module and connected to the first telescopic rod and the second telescopic rod;
   wherein, the drive assembly is a knob assembly arranged on the back of the display module, and an end of the first telescopic rod is hinged with a first side of the knob assembly and an end of the second telescopic rod is hinged with a second side of the knob assembly;
   wherein the knob assembly comprises a knob and a rotating member, one end of the rotating member is connected to the knob, and the end of the first telescopic rod is hinged with a first side of the rotating member and the end of the second telescopic rod is hinged with a second side of the rotating member;
   wherein, the locking mechanism further comprises a cover plate mounted on the back of the display module; a receiving cavity is formed between the cover plate and the display module; a side of the cover plate is provided with a knob hole and the side of the cover plate is away from the display module; a first part of the knob is installed in the receiving cavity, and a second part of the knob protrudes out of the receiving cavity through the knob hole; the cover plate is provided with a third bulge on a first side of the knob hole and a second side of the knob hole, respectively, wherein the first side of the knob hole and the second side of the knob hole are opposite to each other; a face of the third bulge on the first side of the knob hole and a face of the third bulge on the second side of the knob hole are each provided with a first groove for locating the knob when the first telescopic rod and second telescopic rod are extended into the at least two engaged grooves, wherein the face of the third bulge on the first side of the knob hole and the face of the third bulge on the second side of the knob hole are opposite to each other; both sides of the knob opposite to each other are each provided with a fourth bulge for being engaged in the first groove.

6. The display screen according to claim 5, wherein, the back of the display module is concavely provided with a second groove, and a bottom surface of the second groove are convexly provided with two bumps at an interval for connecting with the cover plate; a side surface of each bump of the two bumps is concavely provided with a first through groove and the side surface of each bump of the two bumps faces the cover plate, and a side surface of the cover plate is concavely provided with a second through groove and the side surface of the cover plate is connected to the each bump; the first through groove and the second through groove surround to form a through hole for the first telescopic rod and the second telescopic rod to pass through; the second groove is divided, by the two bumps, into a first groove portion, a second groove portion located on a first side of the first groove portion and a second groove portion located on a second side of the first groove portion, wherein the first side of the first groove portion and the second side of the first groove portion are opposite to each other; two blocks are arranged on the two adjacent frame bars, respectively, and the two blocks are partially engaged in the second groove portion located on the first side of the first groove portion and the second groove portion located on the second side of the first groove portion, respectively; the two engaged grooves are arranged on the two blocks, respectively.

7. The display screen according to claim 1, wherein, the display module further comprises a plurality of first magnets; the back of the display module is further provided with a plurality of installation slots for mounting the plurality of first magnets; a face of the display frame is provided with a plurality of second magnets in alignment with the plurality of first magnets and the face of the display frame is matched with the display module, or the face of the display frame is provided with a plurality of metal parts magnetically attached to the plurality of first magnets; alternatively, the display frame is a metal frame body magnetically attached to the plurality of first magnets; and/or, a number of the display modules is at least two; a number of the locking mechanisms is equal to the number of the display modules, and a number of the engaged grooves is twice the number of the display modules; each display module is locked to the display frame through the locking mechanism.

* * * * *